April 12, 1960  M. M. SMITH  2,932,438
ALL PAPERBOARD SHIPPING CONTAINERS FOR WATER HEATERS
Filed June 25, 1956  4 Sheets-Sheet 2

INVENTOR:
MAX M. SMITH
BY William Dye
ATTORNEYS.

April 12, 1960  M. M. SMITH  2,932,438
ALL PAPERBOARD SHIPPING CONTAINERS FOR WATER HEATERS
Filed June 25, 1956  4 Sheets-Sheet 3
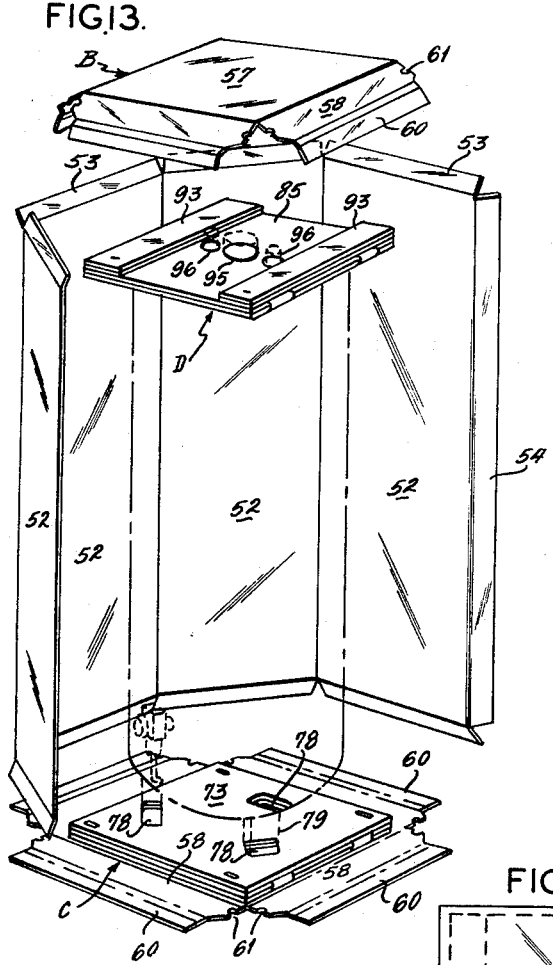
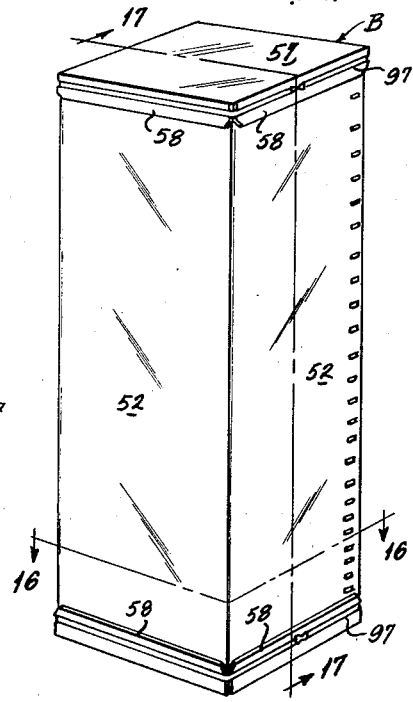
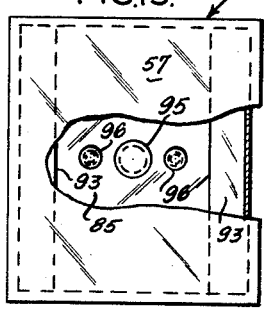
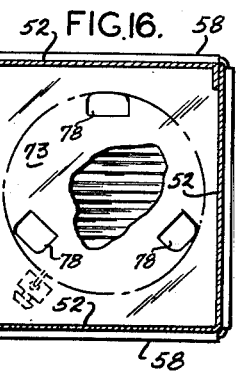
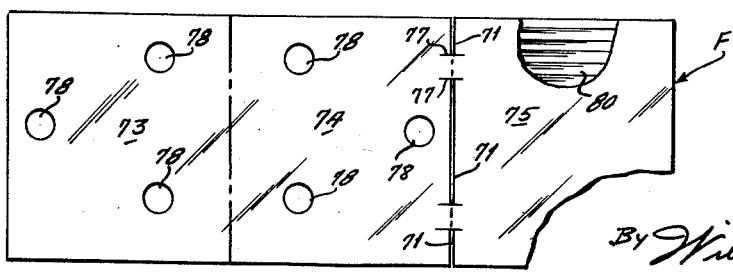
INVENTOR:
MAX M. SMITH
By William Nye
ATTORNEYS.

April 12, 1960     M. M. SMITH     2,932,438
ALL PAPERBOARD SHIPPING CONTAINERS FOR WATER HEATERS
Filed June 25, 1956     4 Sheets-Sheet 4
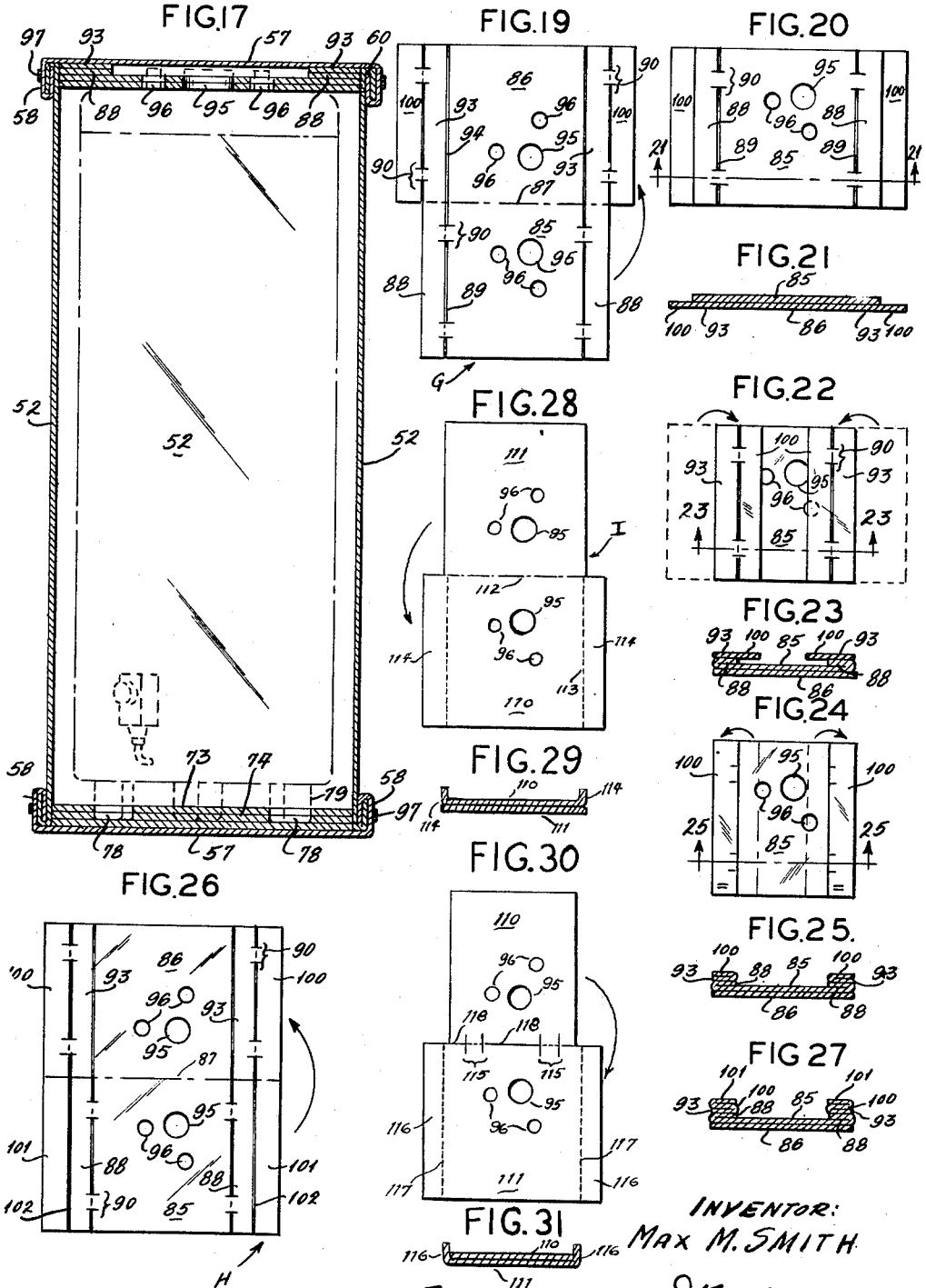
INVENTOR:
Max M. Smith
By William Nye
ATTORNEYS.

United States Patent Office 2,932,438
Patented Apr. 12, 1960

2,932,438

ALL PAPERBOARD SHIPPING CONTAINERS FOR WATER HEATERS

Max M. Smith, Brentwood, Mo., assignor to Crown Zellerbach Corporation, San Francisco, Calif., a corporation of Nevada Application June 25, 1956, Serial No. 593,421

6 Claims. (Cl. 229—14)

The invention relates to relatively tall heavy-duty containers for suspending hot water heaters and other articles for shipment free from contact with the side walls and closures of the container and cushioned against the effects of impacts incident to handling and transportation.

More specifically, the invention comprises a relatively tall polygonal shaped container constructed entirely of paperboard with top and bottom closures in which a water heater, for example, is suspended by its top and bottom fixtures, free of contact with the walls and closures of the container, the fittings of the heater being secured and immobilized in top and bottom pads corresponding in shape to a cross section of the container. The pads are formed from single blanks with substantially no waste, preferably from double wall corrugated paperboard and are scored to define panels co-extensive in width and length which are folded in superimposed relation. The bottom pads have aligned openings in all the panels except at least the bottom panel for securely anchoring the heater legs. The top pads have aligned openings in all of the panels for anchoring the heater flue and enclosing the water pipe nipples, and other top projections, if any. The top pads are also provided with two or more hinged spacing flaps on opposed sides folded over and positioned in superimposed relation on the side margins of the top panel of the pad. The top container closure rests on the superimposed spacing flaps and the number of flaps employed is regulated to provide ample clearance between the top closure panel of the container and the fixtures to protect the top of the flue and pipe nipples of the heater from damage.

In a modified form of the top pad, the top panel of the pad is provided with integral flanges on opposed sides which are folded upwardly in substantially right angular relation to the panel and positioned in fixed flatwise engagement with the side walls of the container. The top closure of the container with the use of this form of the pad, rests on the upstanding longitudinal free edges of the upturned flanges.

The leg receiving openings in the bottom pad are placed so that, with the heater in place, the gas flow regulator will be directed toward one corner of the container, spaced free of the adjacent container walls. The heater is thus securely anchored exclusively by the sturdy flue and legs thereof in the top and bottom pads spaced from the enclosing container walls and the more or less fragile casing and fixtures of the heater cushioned by the pads against the effect of the impacts incident to handling and transportation.

One of the important features of the invention is its simplicity and the economy of material in fabricating and assembling the top and bottom fan-folded pads in which the fittings of the heater are immobilized and the heater cushioned against handling and shipping impacts and other shocks. The cut scores, slits, openings and hinges of the blanks C and D (Figs. 2 and 8) are made in one operation ready for shipment in flat form to the point of use. They may be fan-folded in one continuous rapid operation and secured in assembled form ready for insertion in the container at a minimum labor cost.

An object of the invention is to provide a shipping container with means for firmly suspending and cushioning a water heater or similar appliance within the container with the tank and all projecting fittings spaced inwardly from the walls and closures sufficiently to substantially eliminate the hazard of damage incident to the ordinary course of handling and shipping.

Another object of the invention is to provide a container for packaging water heaters or similar shaped appliances comprising connected together wall panels and top and bottom closures with top and bottom multi-ply paperboard pads dimensioned to fit tightly in the top and bottom portions of the container and in which the top fixtures and legs respectively of the heater are firmly anchored against any substantial movement in any direction with all parts of the heater spaced clear of the container walls and closures.

Still another object is to provide means for suspending a water heater solely by its top and bottom fixtures in an all paperboard container free from contact with the sides and covers thereof, secure against any appreciable movement in any direction and cushioned at the points of suspension against the effect of the impacts arising in the ordinary course of handling and transportation.

Still another object is to provide means for suspending a water heater in a shipping container free from contact with the walls and covers and cushioned against impacts incident to handling and transportation, said means comprising top and bottom pads formed of a plurality of connected together fan-folded paperboard panels, the legs of the heater being immovably held in openings extending through all of the panels of the bottom pad except the lowermost, the flue and pipe nipples extending above the top of the tank being immovably held in openings extending through the top pad with the tops of the fixtures spaced from the top closure of the containers.

Other objects and advantages of this invention will be apparent to those skilled in the art upon a full and complete understanding of the construction and operation of this device.

The invention also consists in the parts, arrangements and combinations of parts hereinafter described and claimed. The accompanying drawings form a part of this specification and like numerals and symbols therein appearing refer to like parts wherever they occur.

Fig. 13 is an exploded perspective view of the container parts and the top and bottom anchoring pads preparatory to enclosing the water heater indicated by dotted lines;

Fig. 14 is a perspective view of the container completely assembled;

Fig. 15 is a top view of the container shown in Fig. 14 partially broken away to show the top fixtures of the heater anchored in the top pad;

Fig. 16 is a horizontal sectional view of the assembled container of Fig. 14 taken in the direction of the arrows 16—16 of Fig. 14;

Fig. 17 is a vertical sectional view of the assembled container of Fig. 14 taken in the direction of the arrows 17—17 of Fig. 14;

Fig. 18 is a plan view of a bottom anchoring pad with anchoring holes for receiving a modified form of heater legs;

Fig. 19 is a plan view of a top anchoring pad provided with three spacing flaps positioned on opposed side margins of the top ply of the pad;

Figs. 20, 21, 22, 23, 24 and 25 illustrate the progressive fan-folding of the top cover blank shown in Fig. 19 into its final position with three superimposed spacing flaps on opposed side margins of the top ply of the pad;

Fig. 26 is a plan view of a blank for forming a top anchoring pad with four spacing flaps;

Fig. 27 is a horizontal sectional view of the blank shown in Fig. 26 in its completely folded position;

Fig. 28 is a plan view of a modified top pad employing foldable spacing flanges integral with the opposed sides of the top panel; and Fig. 29 is a horizontal sectional view of the assembled top pad of Fig. 28 showing the spacing flanges in position folded right angularly upwardly.

Figs. 30 and 31 illustrate a modification of the top pad of Figs. 28 and 29 wherein the spacing flanges are attached to the bottom panel of the pad.

Figure 1:
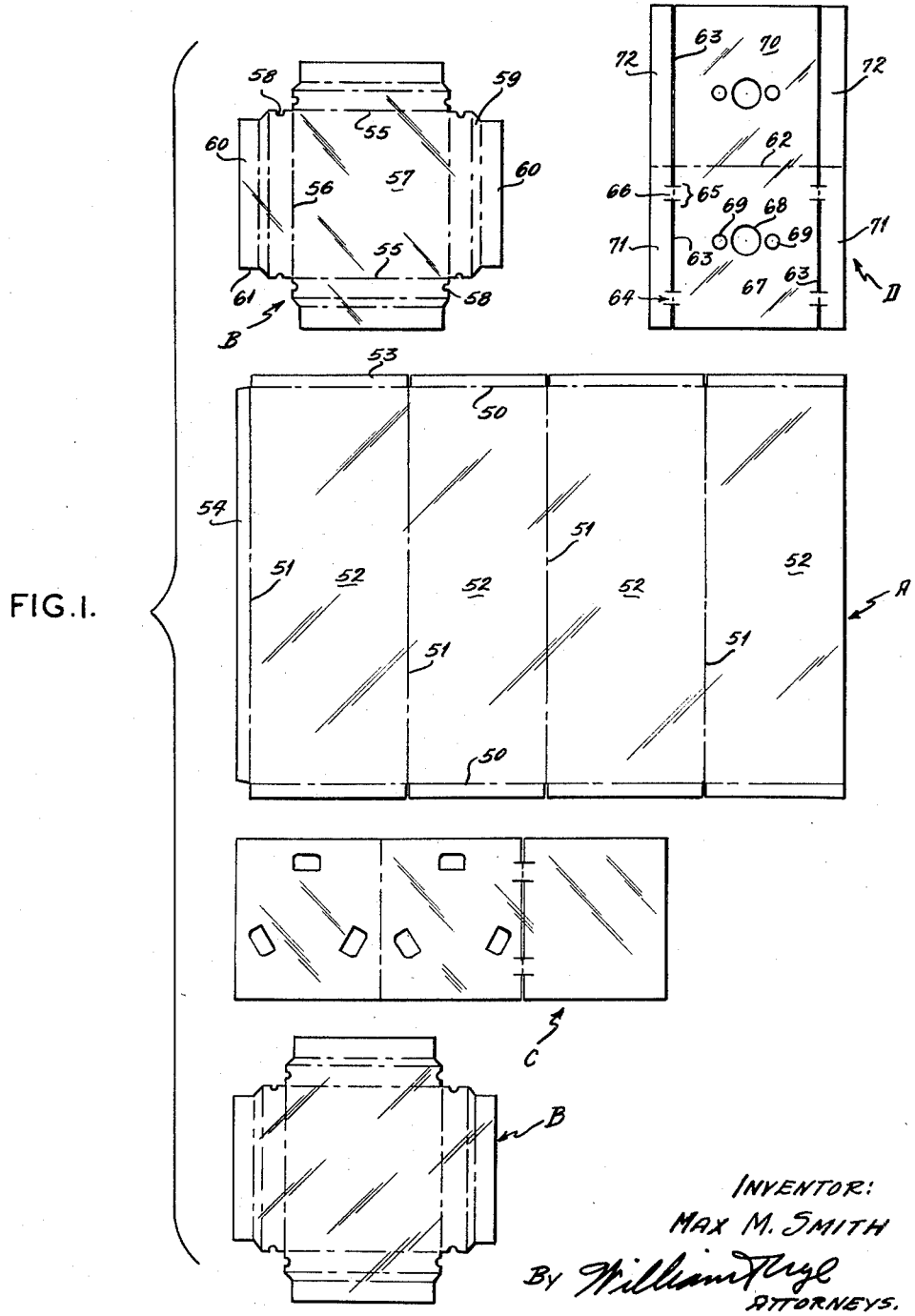
Fig. 1 is a plan view of the blank A of the walls of the container, blanks B of the top and bottom closures, blank C of the bottom anchoring pad and blank D of the top anchoring pad.

The blank A, Fig. 1, is scored longitudinally at 50 and transversely at 51 defining the wall panels 52 of the body of the container, top and bottom panel flaps 53 and sealing flap 54. The blanks B form the top and bottom closure of the container. The scores 55 and 56 define the base panels 57 and the inner edges of closure flanges 58. Double scores 59 define the outer edges of panels 58 and the hinge line of locking flaps 60. Notches 61 in the flanges 58 are for the purpose of receiving and holding the strapping bands in place.

Figure 2:
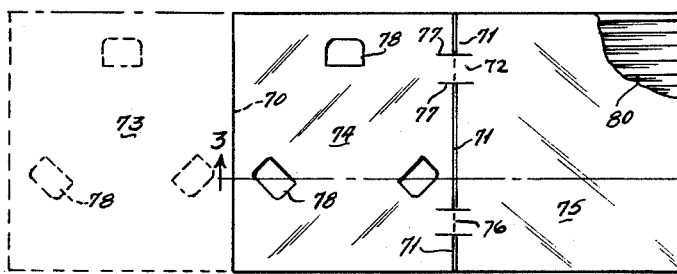
Fig. 2 is an enlarged plan of the bottom pad C.
Figure 4:
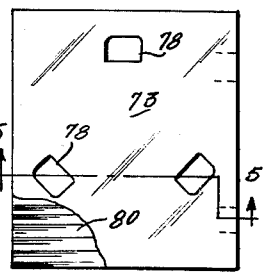
Fig. 4 is a top plan view of blank C in its completely folded form.
Figure 3:
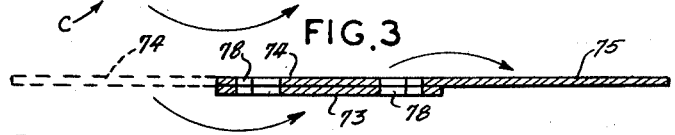
Fig. 3 is a horizontal sectional view of the blank of Fig. 2 partially folded.
Figure 5:
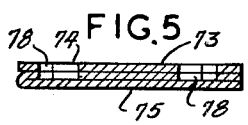
Fig. 5 is a horizontal sectional view of the pad of Fig. 4 taken in the direction of the arrows 5—5.
Figure 8:
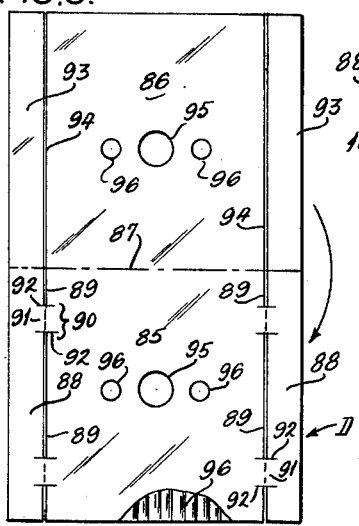
Fig 8 is an enlarged plan view of the top pad D.
Figure 9:
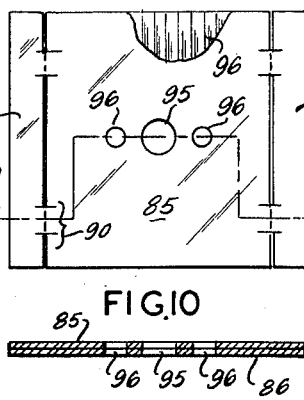
Figs. 9, 10, 11 and 12 illustrate the progressive folding of the blank D to its final position.
Figure 11:
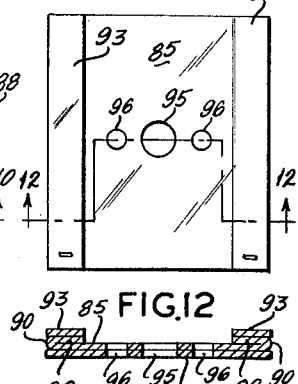
Figure 10:
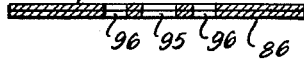
Figure 12:
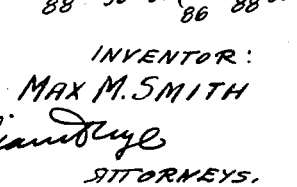

A preferred form of the blanks C and D of the bottom and top pads are shown in Fig. 1 and in enlarged form in Figs. 3 and 8 respectively. The blank C is divided by cut scores 70 and slits 71 with connecting hinges 72 into substantially co-extensive, fan-fold panels 73, 74 and 75. Cut scores formed on the reverse side of the paperboard may be employed instead of slits 71 if desired. This requires an extra operation on the blank and has generally been found to be unnecessary. The hinge connections between panels 74 and 75 are formed by scores 76 extending between and perpendicular to longitudinal slits 77. Panels 73 and 74 have aligned openings 78 for receiving the heater legs 79. A broken away portion 80 of bottom panel 75, shown in Fig. 2, indicates the direction of the corrugations of the corrugated paperboard. Figs. 3, 4 and 5 illustrate the progressive results of fan-folding the blank C into the assembled form shown in Fig. 4 and also in the sectional view, Fig. 5, taken in the direction of the arrows 5—5 of Fig. 4.

As indicated by the folding arrows, top panel 73 is folded about the cut score 70 flatwise against the outer face of the intermediate panel 74. The thus juxtaposed panels are then folded about the hinges 72 flatwise on top of the bottom panel 75 and secured in fan-folded relation, if desired, by staples.

The blank D, Fig. 8, for forming the top pad, is divided into co-extensive, fan-foldable panels 85 and 86 by cut score 87. Flaps 88, co-extensive with the side edges of the top panel 85, are defined by slits 89 and are attached to the side edges of panel 85 by hinges 90, formed by scores 91 and horizontal slits 92. Flaps 93, co-extensive with the side edges of the bottom panel 86, are separated therefrom by slits 94 and are hinged to flaps 88 at their adjacent ends by continuations of cut score 87. Aligned openings 95 enclose and immobilize the flue and aligned openings 96 enclose the pipe nipples. These openings as well as the openings 78 in the bottom pad may be offset slightly to provide ample clearance from the adjacent side walls for the gas flow regulator located on the lower portion of the side of the tank. A portion of the top panel 85 is broken away at 96, in Fig. 9, to show the direction in which the corrugations of the corrugated paperboard extend. Figures 9, 10, 11 and 12 show the progressive results of fan-folding the panels 85 and 86 and the folding of the flaps 88 and 93 to the fully assembled position shown in Figures 11 and 12, forming two spacing thicknesses of paperboard on the opposed margins on the top panel of the pad between the panel and the container top closure. As indicated by the folding arrows, the bottom pad 86 is folded about the cut score 87 flatwise against the under face of the top pad 85 and the spacing flaps 88 folded about the hinges 90 flatwise on the top face of the opposed side margins of panel 85. Spacing flaps 93 are then folded about the extensions of cut score 87 into superimposed relation to the previously folded spacing flaps 88, thus providing two thicknesses of spacing flaps on the top panel 85 to elevate and maintain the top closure of the container spaced above the tops of the heater fixtures.

Figure 6:
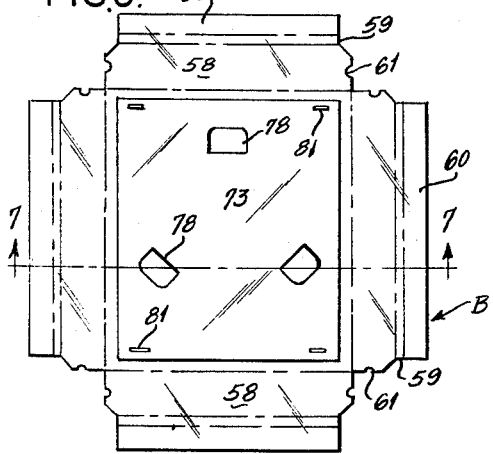
Fig. 6 is a plan view of the bottom closure of the container with the bottom pad shown in Fig. 4 secured thereon.
Figure 7:
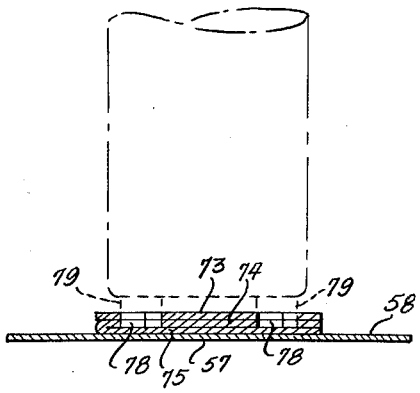
Fig. 7 is a horizontal sectional view of the bottom closure and bottom pad taken in the direction of the arrows 7—7 of Fig. 6 with the bottom portion of a heater in position indicated by dotted lines.

In a convenient method of assembling the container, the fully assembled bottom pad is placed on the panel 57 of the bottom closure, as shown in Fig. 6, and may be permanently secured thereto by staples 81 if desired, although securing means is wholly unnecessary since the pad fits tightly within the container walls in the fully assembled position thereof. A portion of a typical heater is outlined by dotted lines in Fig. 7, with legs 79 enclosed and immobilized in the openings 78 of the bottom pad.

As shown in the exploded perspective view of the several component parts of the container in Fig. 13, the legs 79 of the heater may be placed in the openings 78 in the bottom pad previously positioned in flatwise relation over the bottom closure panel 57 with the top pad resting on the top of the heater with the flue and the pipe nipples enclosed in the openings 95 and 96 therein.

The heater may then be enclosed by the side walls 52 and the top and bottom closures attached to the walls by means of the flanges 58 and the interlocking wall flaps 53 and closure flaps 60 and these parts permanently secured together by bands 97 held in the closure flange notches 61.

Fig. 14 illustrates the fully assembled container with the heater assembled therein, ready for shipment. The flue and pipe nipples of the heater are shown in the partially broken away plan view, Fig. 15, of the assembled container while a horizontal sectional view of the fully assembled package is shown in Fig. 16, taken in the direction of the arrows 16—16 of Fig. 14.

It will be noted that the openings in the bottom pad are placed so that with the heater legs enclosed therein, the gas flow regulator will extend outwardly from the shell in the direction of an adjacent corner, spaced an ample distance from the adjacent side walls to prevent damage by the impacts incident to handling and shipment. The vertical sectional view, Fig. 17, taken in the direction of the arrows 17—17 of Fig. 14, serve to further illustrate the novel method of the invention for suspending the heater within the container solely by the legs and top fixtures in the bottom and top of the tank respectively. It will be noted that the legs on the heater are enclosed by at least two fan-folded thicknesses of paperboard and rest on and are cushioned against impacts by at least one fan-folded panel of the bottom pad and the bottom closure. It will also be noted that the flaps on the opposed side margins of the top panel of the top closure provide ample clearance between the top of the fixtures and the top closure of the container to substantially eliminate the hazard of damage to these fixtures during handling and transportation.

The container and the top and bottom pads for suspending and immobilizing the heater by the top and bottom fixtures thereof may be modified to accommodate variations in the size and shape of the heater to be packaged as well as the particular style of supporting legs and top fixtures employed. For example, Fig. 18 illustrates a blank F similar to the bottom pad blank C of Fig. 2, for forming the bottom pad for receiving and anchoring a heater with a modified style of legs requiring circular retaining openings.

The top pad may be modified as illustrated in Figs. 19 to 25 inclusive, to provide three spacing flaps positioned on opposed side margins of the top panel of the pad. This modification is necessary where the height of the top fixtures of the heater above the shell provided by two flaps on each side of the top panel, as illustrated in Figs. 8 to 12 inclusive, is insufficient to provide proper clearance for their protection. The blank G for forming this modification of the pad is shown in Fig. 19 wherein the top and bottom panels 85 and 86 are substantially the same as in the blank shown in Fig. 8, including the spacing flaps 88 and 93. In this case additional flaps 100 co-extensive with and hinged to flaps 93 are provided. The blank is fan-folded and the spacing flaps positioned over the side margins of the top panel 85 in the same manner as hereinbefore described in connection with the blank D of Fig. 8, through the position shown in the plan view Fig. 22, and the horizontal sectional view, Fig. 23. The flaps 100 are then folded about the hinge 90 in superimposed relation over the flaps 93 as clearly illustrated in the plan view, Fig. 24, and the horizontal sectional view, Fig. 25.

Another variation of the top pad to provide four superimposed spacing flaps on the opposed margins of the top panel is shown in blank form H, Fig. 26. This blank is substantially the same as the blank G of Fig. 19, with additional spacing flaps 101 hinged to flaps 100 at their adjacent ends by a continuation of the cut score 87. The flaps 101 are separated from flaps 88 by slits 102. The blank H is folded in the same manner as described for the blank G of Fig. 19, with the additional flaps 101 positioned in superimposed, conterminous relation over flaps 100.

A still further modification of the top pad is illustrated in Figs. 28 and 29. In this form of the pad, the blank I is divided into top and bottom panels 110 and 111 respectively, by a cut score 112. The bottom panel 111 is dimensioned to fit tightly in the upper margin of the container while the top panel 110 is perforated at 113 to define spacing flanges 114 which are folded right angularly upwardly to support the top panel 57 of the top closure in the assembled position of the container. The perforations 113 are offset inwardly slightly to provide folding clearance for the flanges 114. This form of the top pad results in a still further economy of paperboard and simplification of fabrication and assembly of the top pad. After the blank I is folded about the cut score 112 and the flanges 114 folded right angularly upward, the pad may be conveniently inserted through the top of the container to its fixed position enclosing the top fixtures of the heater, the resiliency of the paperboard serving to firmly maintain the flanges 114 flatwise against the container walls.

Figures 30 and 31 illustrate a modification of the embodiment shown in Figs. 28 and 29 wherein the top and bottom panels 110 aand 111 are attached to each other by hinges 115 in the same manner as shown in Figs. 2 and 18. Slits 118 are cut between and on each side of the hinges 115. In this form of the invention the spacing flanges 116 are defined by perforated scores 117 on the bottom panel 111, offset outwardly for folding clearance for positioning the flanges 116 right angularly upwardly as shown in Fig. 31. The pad may be inserted through the top of the container as described in connection with Figs. 28 and 29.

It is to be understood that the embodiments of the invention herein described are illustrative and not restrictive and it is also to be understood that the invention may be susceptible of embodiment in other modified forms and that all such modifications which are similar and are equivalent hereto come within the scope of the appended claims.

What I claim is:

1. A bottom pad adapted to immobilize and cushion the legs of an appliance or other article enclosed in a shipping container, the pad comprising a plurality of connected together paperboard panels coextensive in dimensions with each other and with a cross section of the container, fan-folded in superimposed relation, the top panel of the pad being foldably connected to a second panel by a cut score, the second and succeeding panel being connected together at their folds by hinges positioned inwardly of the outer edges of the panels, formed of a relatively short folding score at the adjacent integral edges of the panels, the scores being terminated by parallel longitudinal slits extending into the adjacent margins of the panels, the hinged panels being separated by slits extending between the hinges and from each hinge to the outer edges of the panels, the first and second panels having aligned openings therein for receiving the legs of the appliance, the succeeding panel providing a cushion on which the said legs of the appliance rest.

2. A top pad adapted to immobilize the top fixtures of an appliance or other article enclosed in a shipping container, the pad comprising top and bottom panels coextensive in dimensions with each other and with a cross section of the container, fan-folded in superimposed relation, the panels having aligned openings for receiving and immobilizing the top fixtures of the appliance, the top panel of the pad having flaps connected thereto by hinges positioned inwardly of the top and bottom edges of the panel formed of relatively short folding scores at the adjacent integral edges of the panel and flaps, the scores being terminated by parallel longitudinal slits extending into the adjacent margins to the panels, the hinged panels being separated by slits extending between the hinges and from each hinge to the top and bottom edges of the panels, the bottom panel of the pad having flaps coextensive therewith and separated therefrom by slits, the bottom panel flaps being connected to the top panel flaps and foldable about an extension of the cut score defining the top and bottom panels, in the assembled position of the pad, the flaps of the top panel being folded inwardly about their hinges over the opposed margins of the panel with the bottom panel flaps folded in superimposed relation over the folded top panel flaps, forming ledges on which the top closure of the container rests with a clearance above the tops of the appliance fixtures.

3. A pad adapted to immobilize outward extending projections of an article of manufacture, the pad comprising at least two connected together paperboard panel means folded one over the other and for insertion in a container to immobilize an article therein, the panel means having hinged means, the hinge means comprising longitudinally spaced apart slits extending into marginal portions of adjacent panel means and providing a connecting folding web for the same, the paperboard being weakened along a line substantially at right angles to the slits and intersecting the hinge means and along with the folding web allowing for folding the panel means one over the other, and one panel means having openings therein for receiving the projections of the article of manufacture and the other panel means folded over the said one panel means.

4. The pad structure as defined in and by claim 3 wherein the panel means includes at least one panel, which panel has integral flaps at opposite sides thereof connected therewith by the said connecting folding webs formed by the longitudinally spaced apart slits, and the paperboard being weakened along a line substantially at right angles to the slits and intersecting the hinge means formed by the slits and allowing for the folding of the flap means over the panel.

5. The pad as defined in and by claim 3 wherein there are at least two spaced apart connecting folding webs formed by the said slits and the panel means is slit between the said webs.

6. A pad adapted to immobilize outward extending projections of an article of manufacture, the pad comprising at least two connected together paperboard panel means folded one upon the other and for insertion in a container to immobilize an article therein, the panel means having hinged means positioned inwardly of its edges, the hinge means comprising longitudinally spaced apart slits extending into adjacent margins of the panel means, the paperboard being weakened between the hinge means and from each hinge means to the outer edges of the panels, and one panel means having openings therein for receiving the projections of the article of manufacture and the other panel folded over the opening.

References Cited in the file of this patent
UNITED STATES PATENTS

| | | |
|---|---|---|
| 1,852,832 | Beaman | Apr. 5, 1932 |
| 2,321,063 | Bohnke | June 8, 1943 |
| 2,490,186 | Yarman | Dec. 6, 1949 |
| 2,665,002 | Baumann et al. | Jan. 5, 1954 |
| 2,753,101 | Zimmerman | July 3, 1956 |